US011129135B2

(12) United States Patent
Atungsiri et al.

(10) Patent No.: US 11,129,135 B2
(45) Date of Patent: Sep. 21, 2021

(54) COMMUNICATIONS DEVICE, INFRASTRUCTURE EQUIPMENT AND METHODS

(71) Applicant: Sony Corporation, Tokyo (JP)

(72) Inventors: Samuel Asangbeng Atungsiri, Basingstoke (GB); Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 16/610,531

(22) PCT Filed: May 4, 2018

(86) PCT No.: PCT/EP2018/061578
§ 371 (c)(1),
(2) Date: Nov. 4, 2019

(87) PCT Pub. No.: WO2018/202883
PCT Pub. Date: Nov. 8, 2018

(65) Prior Publication Data
US 2020/0059895 A1 Feb. 20, 2020

(30) Foreign Application Priority Data

May 5, 2017 (EP) .................................... 17169834
Jun. 16, 2017 (EP) .................................... 17176446

(51) Int. Cl.
*H04L 1/00* (2006.01)
*H04W 72/00* (2009.01)
(Continued)

(52) U.S. Cl.
CPC ......... *H04W 72/005* (2013.01); *H04L 1/0076* (2013.01); *H04L 5/005* (2013.01); *H04W 56/001* (2013.01)

(58) Field of Classification Search
CPC .............. H04W 72/005; H04W 56/001; H04L 1/0076; H04L 5/005; H04L 5/0053; H04L 5/0048; H04B 7/0408
See application file for complete search history.

(56) References Cited

U.S. PATENT DOCUMENTS

2013/0315191 A1* 11/2013 Yoshimoto ........... H04J 11/0056
370/329
2015/0029874 A1* 1/2015 Davydov ............... H04W 24/10
370/252

(Continued)

FOREIGN PATENT DOCUMENTS

EP 2675212 A 12/2013

OTHER PUBLICATIONS

International Search Report and Written Opinion dated Aug. 10, 2018 for PCT/EP2018/061578 filed on May 4, 2018, 12 pages.

(Continued)

*Primary Examiner* — Lakeram Jangbahadur
(74) *Attorney, Agent, or Firm* — Xsensus LLP

(57) ABSTRACT

In a wireless communications system, an infrastructure equipment is configured to form a synchronization signal block comprising one or more Orthogonal Frequency Division Multiplexed, OFDM, symbol carrying a synchronization sequence and one or more other OFDM symbols carrying information of a physical broadcast channel of the wireless access interface. Each of the one or more OFDM symbols of the synchronization block is formed by a plurality of frequency domain sub-carrier signals each being transmitted over the duration of the OFDM symbol in a resource element of the wireless access interface. Each OFDM symbol of the synchronization signal block has the same sub-carrier spacing, and each of the one or more other OFDM symbols carrying information of a physical broad- (Continued)

cast channel of the wireless access interface is arranged to include demodulation reference symbols.

17 Claims, 8 Drawing Sheets

(51) Int. Cl.
*H04L 5/00* (2006.01)
*H04W 56/00* (2009.01)

(56) References Cited

U.S. PATENT DOCUMENTS

2016/0065337 A1* 3/2016 Atungsiri ............ H04L 27/2663
    375/260
2017/0331613 A1* 11/2017 Ly ......................... H04L 5/0048
2019/0081842 A1* 3/2019 Kim .................... H04W 56/001

OTHER PUBLICATIONS

NTT Docomo, Inc., "New WID on New Radio Access Technology", 3GPP TSG RAN Meeting #75, RP-170847, Mar. 6-9, 2017, Dubrovnik, Croatia, Total 8 pages.
Holma, H. et al., "LTE for UMTS: OFDMA and SC-FDMA Based Radio Access", System Architecture Based 3GPP SAE, John Wiley & Sons, Ltd., 2009, 8 pages.
Vlado Spajic, et al., "Narrowband Internet of Things", NB-IOT, Qualcomm, RAN#69, vol. 16, Mar. 2017, pp. 201-206.

* cited by examiner

COMMUNICATIONS DEVICE, INFRASTRUCTURE EQUIPMENT AND METHODS

CROSS-REFERENCE TO RELATED APPLICATIONS

This application is based on PCT filing PCT/EP2018/061578, filed 4 May 2018, which claims the benefit of priority from EP Patent Application number 17169834.3, filed on 5 May 2017 and EP Patent Application 17176446.7, filed on 16 Jun. 2017, the entire contents of each are incorporated herein by reference.

BACKGROUND

Field of Disclosure

The present disclosure relates to wireless communications devices which are configured to transmit data to or receive data from a wireless communications network via a wireless access interface and which are configured to detect information broadcast or unicast to the wireless communications devices to facilitate the reception of data. The present technique also relates to infrastructure equipment forming part of a wireless communications network and transmitters and receivers.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements. The introduction of new radio access technology (RAT) systems/networks therefore gives rise to new opportunities as well as challenges.

SUMMARY OF THE DISCLOSURE

Respective aspects and features of the present disclosure are defined in the appended claims.

According to the present technique there is provided, in a wireless communications system, an infrastructure equipment forming part of a radio access network of a wireless communications network. The infrastructure equipment is configured to form a synchronisation signal block comprising one or more Orthogonal Frequency Division Multiplexed, OFDM, symbol carrying a synchronisation sequence and one or more other OFDM symbols carrying information of a physical broadcast channel of the wireless access interface. Each of the one or more OFDM symbols of the synchronisation block is formed by a plurality of frequency domain sub-carrier signals each being transmitted over the duration of the OFDM symbol forming a resource element of the wireless access interface. Each OFDM symbol of the synchronisation signal block has the same sub-carrier spacing, and each of the one or more other OFDM symbols carrying information of a physical broadcast channel of the wireless access interface is arranged to include demodulation reference symbols. The infrastructure equipment is configured to transmit the synchronisation signal block to the one or more wireless communications devices for receiving the broadcast information provided by the physical broadcast channel. A wireless communications device operating with the wireless communications network is configured to generate an estimate of the channel transfer function for detecting the broadcast channel information using either or both the resource elements of the OFDM symbol carrying the synchronisation sequence in the synchronisation signal or by using the demodulation reference symbols received in the OFDM symbol carrying the physical broadcast channel information. Accordingly the information carried by the synchronisation block is more likely to be received correctly because of an improvement in the estimate of the channel transfer function or the same information can be carried with reduced resources.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

LTE Technology (4G)

Figure 1:
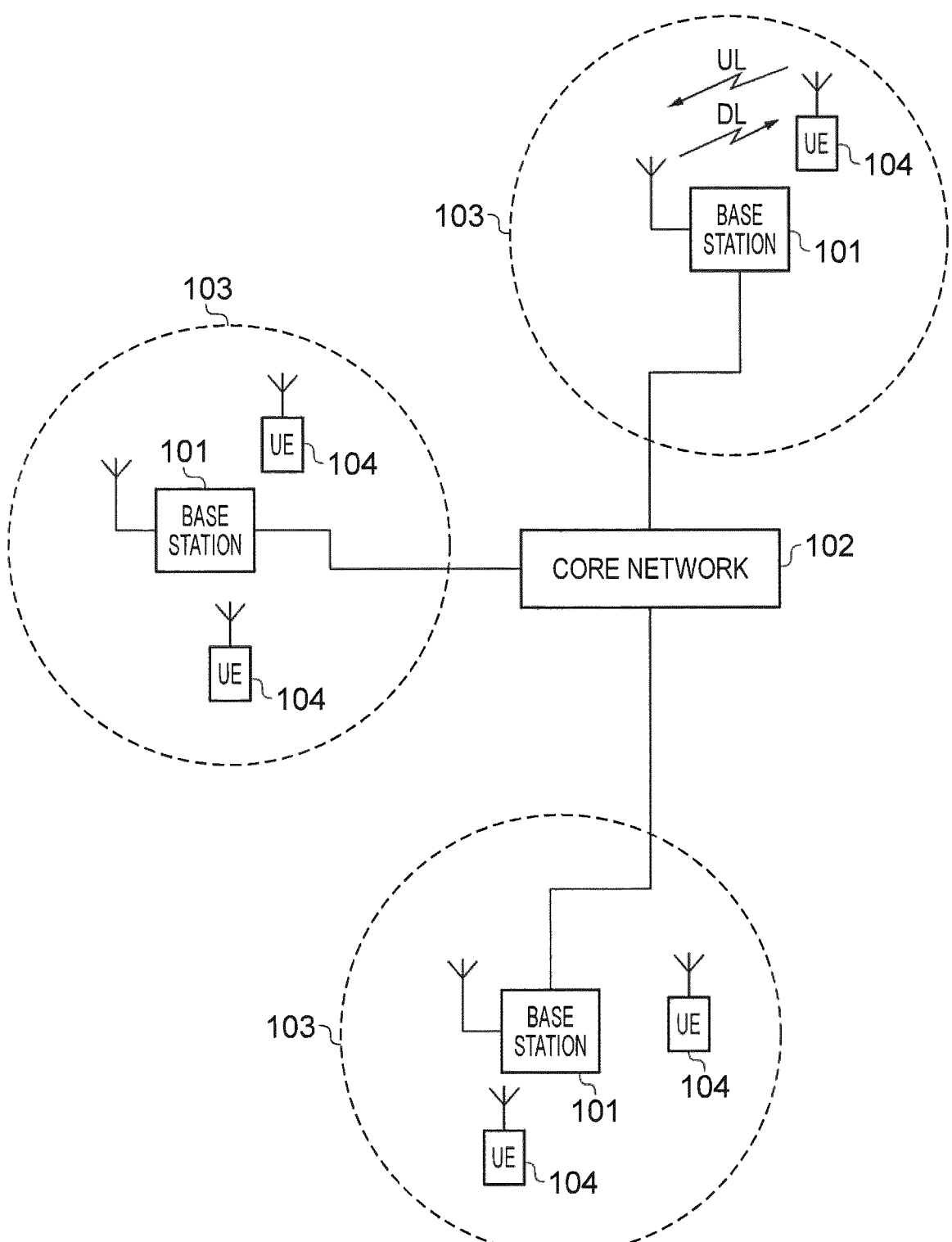
FIG. 1 is a schematic block diagram illustrating in example current configuration of a wireless communications network in accordance with a conventional LTE standard.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1].

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Access Technology (5G)

As mentioned above, the embodiments of the present invention can find application with advanced wireless communications systems such as those referred to as 5G or New Radio (NR) Access Technology. New Radio Access Technology (RAT) has been proposed in [2] to develop a new RAT for the next generation wireless communication system, i.e. 5G, and in 3GPP a Study Item (SI) on NR has been agreed [3] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Figure 2:
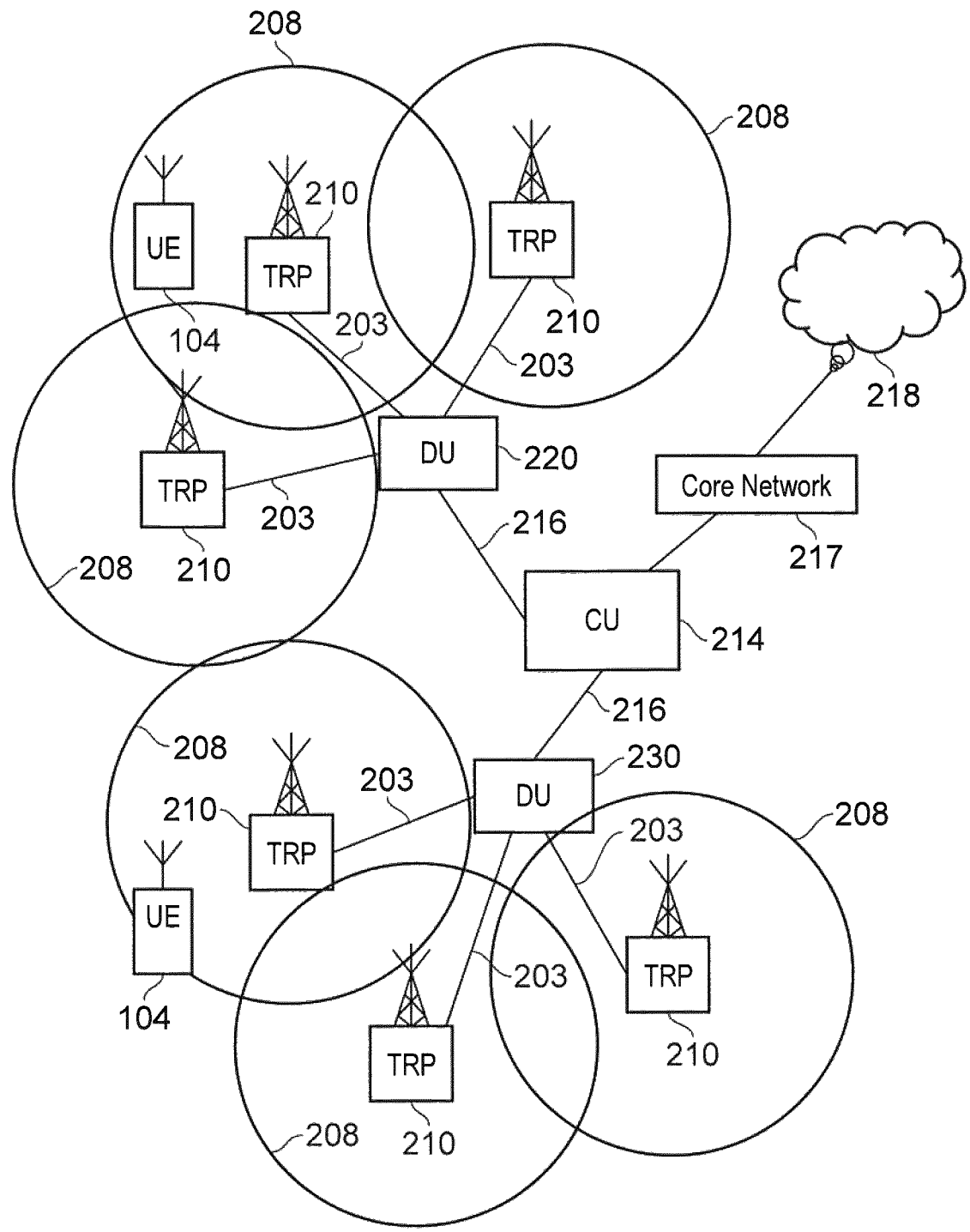
FIG. 2 is a schematic block diagram of an example of a wireless communications network configured in accordance with an example of an enhanced new radio (NR) or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage
Flexible mobility An example configuration of a wireless communications network which uses some of the terminology proposed for new radio (NR) and 5G is shown in FIG. 2. In FIG. 2 a plurality of transmission and reception points (TRP) 210 are connected to distributed control units (DU) 220, 230 by a connection interface represented as a line 203. Each of the transmitter receiver points (TRP) 210 is arranged to transmit and receive signals via a wireless access interface within a radio frequency bandwidth available to the wireless communications network. Thus within a range for performing radio communications via the wireless access interface, each of the TRP 210, forms a cell of the wireless communications network as represented by a dashed line 208. As such wireless communications devices 104 which are within a radio communications range provided by the cells 210 can transmit and receive signals to and from the TRP 210 via the wireless access interface. Each of the distributed control units 220, 230 are connected to a co-ordinating unit (CU) 214 via an interface 216. The CU 214 is then connected to the a core network 217 which may contain all other functions required for communicating data to and from the wireless communications devices and the core network 217 may be connected to other networks 218.

The elements of the wireless access network shown in FIG. 2 may operate in a similar way to corresponding elements of an LTE network such as that shown in FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB 101 of an LTE network, and so the terms TRP, eNodeB and gNodeB in the following description are interchangeable. Base stations, which are an example of radio network infrastructure equipment, may also be referred to as transceiver stations/ NodeBs/eNodeBs (eNBs)/gNodeBs (gNBs), and so forth. Similarly the communications devices 104 may have a functionality corresponding to devices know for operation with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

As will be appreciated both the UEs and the base station/ TRP/eNodeB/gNodeB may be implemented using radio frequency filters and circuits as well as signal processing hard and controlling logic implemented as ASICs or programmable controllers.

Figure 3A:
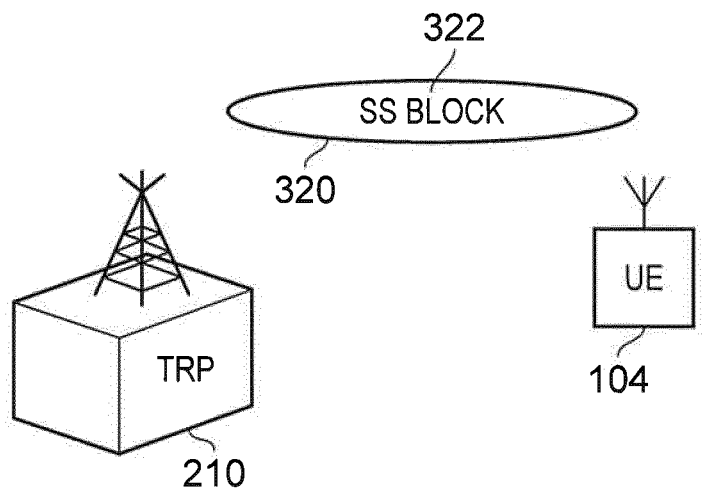
FIG. 3a is a schematic representation illustrating an arrangement in which a communications device initially detects a synchronisation block transmitted by a base station, gNodeB or TRP.

As shown in FIG. 3a when a UE 104 attempts to gain initial access to the wireless communications network it must detect information broadcast by one of the base stations (TRPs or gNodeBs) 210. According to one example, the gNodeB 210 includes a plurality of antennas which form an antenna array and using known techniques the signal transmitted from the gNodeB can be formed into a beam 320. The beam 320 transmits a synchronisation signal block 322 for detection by the UE 104. According to one example the synchronisation signal block 322 includes primary and secondary synchronisation signals as well as broadcast system information carried in a physical broadcast channel (PBCH).

Figure 3B:
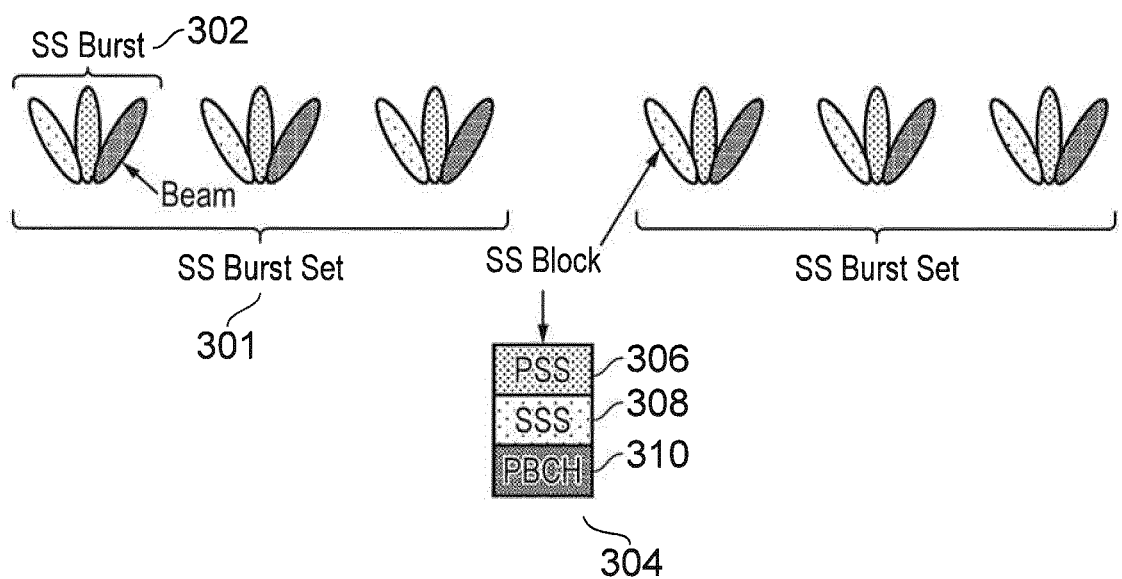
FIG. 3b is an illustrative representation showing the transmission of a synchronisation block comprising a primary and secondary synchronisation signals and a physical broadcast channel as proposed for NR.

For any waking UE accessing the NR network, it is expected that it would detect the primary and secondary synchronisation signals (PSS and SSS) to gain time, frequency and frame synchronisation as well as sector, group and cell identity information. The use of multiple antennas both at the UE and gNodeB further allows the use of beam forming to improve a spectral efficiency or traffic density which can be supported by the wireless communications system. The requirement for UEs to be able to synchronise to each of these beams separately means that the gNodeB can transmit separate synchronisation signals and one or more PBCH OFDM symbols for each beam that it forms. This separation of the synchronisation signals (SSS and PSS) can lead in some examples to the concept of a synchronisation signal block or burst comprised of the PSS, SSS and PBCH (where a synchronisation signal block is typically applied to a single beam). A synchronisation signal burst is comprised of multiple synchronisation signal blocks, where each synchronisation signal block within the synchronisation signal burst can be applied to a different beam. A synchronisation signal burst set is then comprised of multiple synchronisation signal bursts. Synchronisation signal blocks for a particular beam can be combined by the UE between synchronisation signal bursts within the synchronisation signal burst set. From a given gNodeB, the synchronisation signal burst set is repeated at regular intervals for use by new UEs entering the network and for enabling the UEs to perform down-link cell measurements and other procedures. An example is shown in FIG. 3b, where there are three synchronisation signal blocks 304 (each comprised of the PSS 306, SSS 308 and PBCH 310) in a synchronisation signal burst 302 as shown, i.e. three different beams for each synchronisation signal burst. In this example the synchronisation signal burst set 301 has three synchronisation signal bursts 302 and the synchronisation signal burst set 301 is repeated. It should be appreciated that other numbers of synchronisation signal blocks 304 per synchronisation signal burst 302 can be used and the number of synchronisation signal bursts 302 per synchronisation signal burst set 304 can be different, FIG. 3 being just one example.

Following acquisition of the PSS and the SSS, the UE can then find and decode the physical broadcast channel (PBCH) which in turn provides the UE with critical system and configuration information of the particular component carrier and/or beam. This critical system and configuration information is sometimes referred to as a "Master Information Block", MIB. Once the UE has decoded MIB, it may then decode other system information that is carried in System Information Blocks (SIBs).

The detection of the PSS and SSS entails the processing of signals to detect the particular sequences used in their construction, without need for channel estimation and equalisation. The decoding of the PBCH on the other hand requires channel estimation and equalisation prior to demodulation and error decoding (for example, performing decoding of a forward error correction code, such as a polar code or a tail biting convolutional code) of critical system information bits carried by the PBCH. Channel estimation requires the transmission of reference symbols that can be used to estimate the channel transfer function. Since reference symbols do not carry any information, it can be argued that their use reduces spectral efficiency. It is therefore desirable to reduce the number or density of reference symbols so as to minimise the loss in spectral efficiency arising from their inclusion.

Demodulation Reference Symbols for NR-PBCH

Embodiments of the present technique can provide an arrangement in which a wireless communications device operating within a wireless communications network can more efficiently detect information from a control channel such as a physical broadcast channel which is transmitted as one or more OFDM symbols preceded by a synchronisation OFDM symbol which is initially detected by a communications device or UE when the UE initially attempts to access the wireless communications network. Embodiments of the present technique can provide an arrangement in which the demodulation reference symbols (DMRS) which are used to estimate a channel transfer function or channel impulse response are transmitted in the PBCH OFDM symbols, wherein the PBCH OFDM symbols either do not have demodulation reference symbols in sub carrier signals in a frequency range which overlaps those of the synchronisation OFDM symbol or has a different pattern of reference symbols in this overlapping region compared to a region which does not overlap the frequencies of the synchronisation OFDM symbol. Embodiments of the present technique will now be described.

Accordingly, since each of the PBCH OFDM symbols or the control carrying OFDM symbols must be equalised and error detection performed in order to recover the information carried by the PBCH OFDM symbols, a more reliable channel estimate can be determined by combining the part or parts of the channel estimate formed from the synchronisation OFDM symbol and the part or parts formed from the demodulation reference symbols carried by the PBCH OFDM symbols. In some examples therefore the estimation of the channel in the overlapping region is different to that in the non-overlapping region of the PBCH OFDM symbols.

In LTE-A (LTE-Advanced), the PSS is composed of one of three sequences. Detecting any one of these sequences at the UE indicates that the component carrier is transmitted from one of three possible sectors of the eNodeB. The SSS on the other hand carries two 31 element sequences which can be arranged in one of 168 possible ways. Between them, the PSS and SSS can therefore signal 504 different cell identities ranging from 0 to 3*167+2=503. Once the UE decides what sequence P(n) is carried in the given synchronization symbol, the channel transfer function (CTF) $H_i(n)$ in each case can be determined by dividing the sequence of REs $R_i(n)$ with the transmitted reference sequence.

$$H_i(n) = \frac{R_i(n)}{P(n)}$$

When the relative speed of the receiver is low enough such that the Doppler frequency is less than $$\frac{1}{2KT_s}$$

where $T_s$ is the duration of one OFDM symbol, then the channel transfer function $H_i(n)$ determined from symbol i can be used for equalizing symbol (i±m) where 0≤m≤K.

Figure 4:
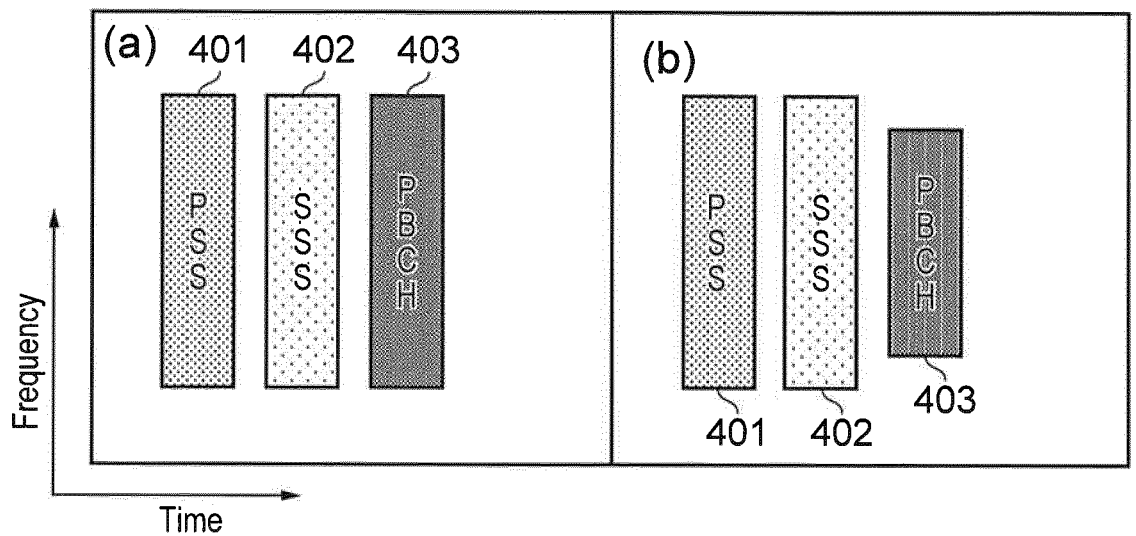
FIGS. 4a and 4b are schematic representations of a primary synchronisation signal, a secondary synchronisation signal and a physical broadcast channel carrying system information signalling forming part of a synchronisation signal block shown in FIGS. 3a and 3b.

Therefore the SSS can be used to estimate the channel transfer function used for demodulating the PBCH OFDM symbols so long as the PBCH OFDM symbols are within ±K symbols of the SSS. To use the synchronisation signal as reference symbols for channel estimation in decoding the PBCH OFDM symbols, the following must hold:

- The PBCH and synchronisation signal OFDM symbols are in the same frequency band
- The PBCH and synchronisation signal OFDM symbols use the same sub carrier spacing (SCS)
- The PBCH and synchronisation signal OFDM symbols coincide in frequency with the PBCH using the same REs as shown in FIG. 4a or fewer REs as shown in FIG. 4b (described below) as the synchronisation signal i.e. the PBCH has the same or lower bandwidth than the synchronisation signal.
- The PBCH and synchronisation signal uses the same precoding vector, which would be the case if they share the same beam FIGS. 4a and 4b provide representative examples of the PSS and SSS and a PBCH OFDM symbol as three OFDM symbols 401, 402, 403 within dimensions of both frequency and time. The dimensions in frequency correspond to a number of subcarriers transmitted in resource elements of the wireless access interface provided by the wireless communications network. However, each OFDM symbol is transmitted successively in time one after the other with the PSS and SSS 401, 402 transmitted first followed by the PBCH symbol 403. FIG. 4b provides a further example in which a bandwidth of the PBCH 403 is smaller than that of the PBCH shown in FIG. 4a. Note that the synchronisation signals that are used by the UE as reference symbols may depend on the characteristics of the synchronisation signal and how a network is deployed. For example, the PSS from neighbouring cells may carry the same synchronisation sequence and so if the PSS were used for channel estimation, a UE seeing more than one PSS from different cells will likely discern a multipath channel akin to one from a single frequency network (SFN). The composite channel of the SFN may not be indicative of the channel on the PBCH as the PBCH broadcast from different cells carries different information. In such a case, the UE may only use the SSS (which can be deployed with a greater reuse pattern—the SSS is sufficiently different between neighbouring cells), since these signals are more indicative of the channel on the PBCH.

On the other hand, the PBCH OFDM symbols can dedicate some REs for carrying demodulation reference symbols (DMRS). The optimum density of such DMRS is determined by the expected delay spread of the channel. Since the cyclic prefix $T_g$ adopted for the network is already designed to just exceed the maximum expected delay spread, the DMRS can have a density or frequency spacing of $$\frac{1}{T_g} \text{Hz.}$$

When $T_g$ is long, the high density (small spacing in frequency) of DMRS has an impact on the spectral efficiency of the PBCH.

Note that the wider the PBCH bandwidth (the higher the number of Res used for PBCH), the more minimum system information it can carry or conversely, the more robustly it can carry the minimum system information. Alternatively a wider bandwidth PBCH can carry the same amount of minimum system information in a smaller number of OFDM symbols, allowing the duration of a synchronisation signal block to be shorter, hence allowing more synchronisation signal blocks (and more beams) to be supported in a given time period. Therefore it is highly unlikely that the bandwidth of the PBCH would be less than that of the synchronisation signal as in FIG. 4(b). Further, given a certain amount of minimum system information, the use of DMRS means that the PBCH is more likely than not to occupy a wider bandwidth than the synchronisation signal, so that the PBCH may have more than double the bandwidth of the PSS and SSS as illustrated in FIG. 5.

Figure 5:
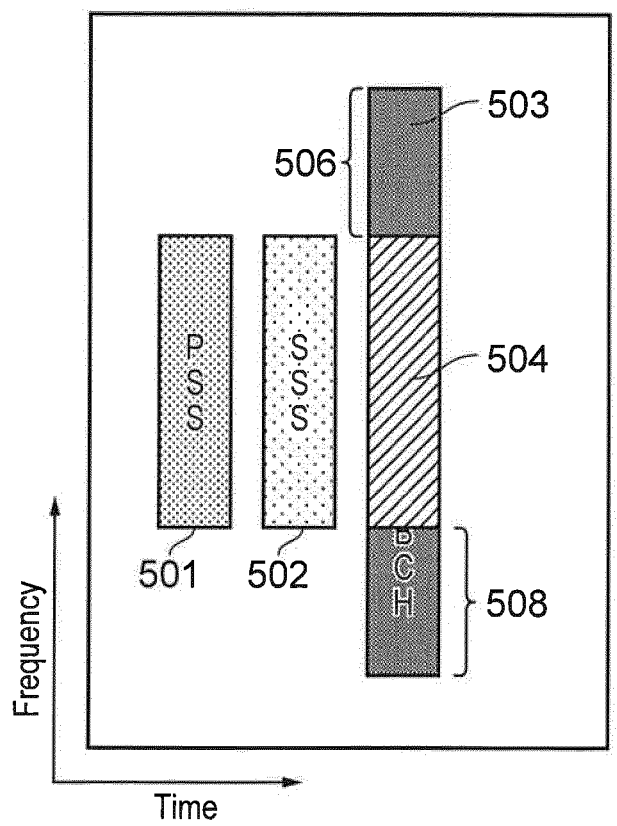
FIG. 5 is a schematic representation of a synchronisation block comprising OFDM symbols transmitting a primary synchronisation signal, a secondary synchronisation signal and a physical broadcast channel signal in which the physical broadcast channel signal has a wider bandwidth than the primary and secondary synchronisation signals.

FIG. 5 provides schematic representation of a synchronisation signal block in accordance with the present technique. As shown in FIG. 5 a representation of a PSS and SSS 501, 502 are shown in the form in which they correspond to those in FIGS. 4a and 4b. However, the OFDM symbol carrying the PBCH information 503 has an increased bandwidth with respect to those of the synchronisation signals 501, 502. As shown in FIG. 5 since a bandwidth of the PBCH carrying OFDM symbol is greater than that of the synchronisation signals 502, 501, a region exists which is referred to as an overlapping region 504 in which the sub carrier signals of the PBCH OFDM symbol have the same or overlapping frequencies to the OFDM symbols of the PSS 501 and SSS 502. Correspondingly there are also two regions 506, 508 where the sub carriers transmitted in these frequencies do not overlap or are not common to the sub carrier signals transmitted in the PSS and SSS OFDM symbols 501, 502.

Varied Reference Symbols for PBCH

Figure 6:
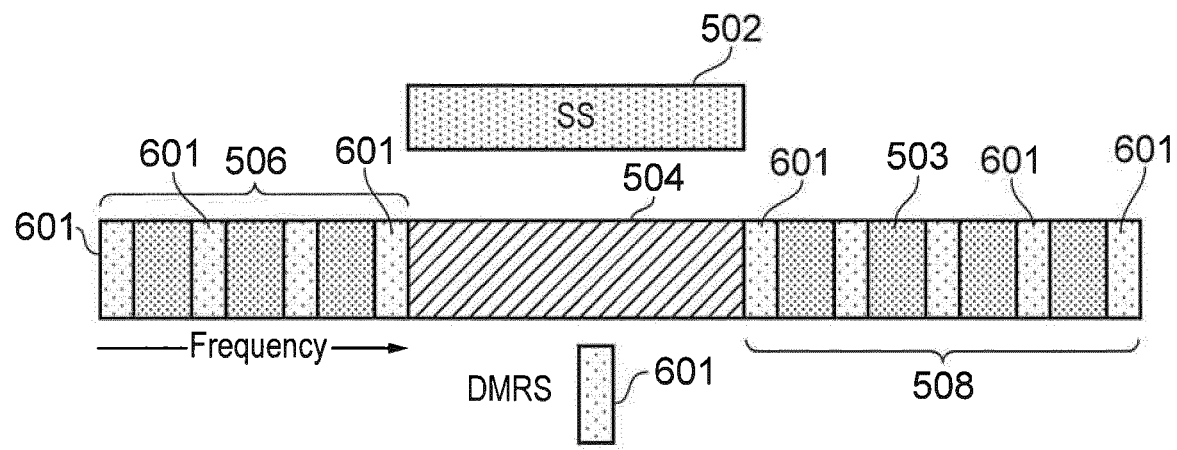
FIG. 6 is a schematic representation of an example of a physical broadcast channel OFDM symbol in accordance with an embodiment of the present technique and a secondary synchronisation OFDM symbol in which a region in the frequency domain of the physical broadcast channel OFDM symbol which overlaps the frequencies of the synchronisation signal do not contain reference symbols.

Embodiments of the present technique can provide an arrangement in which demodulation reference symbols which are used for channel estimation are arranged differently within an overlapping region of a PBCH OFDM symbol to those of a non-overlapping part of the PBCH OFDM symbol with respect to frequencies in common with a synchronisation OFDM symbols. As shown in FIG. 6 small square elements 601 represent sub-carriers which carry demodulation reference symbols (DMRS). As shown in FIG. 6 which provides a representation in which the axis of time and frequency are exchanged with respect to the example of FIGS. 4 and 5, the synchronisation OFDM symbol 602 is shown to occupy a common region of frequencies in which sub-carriers are transmitted in the PBCH OFDM symbol 604. Thus, a hatched region 606 is shown which comprises sub-carriers which are transmitted on common frequencies to the sub-carriers of the synchronisation OFDM symbol 602 and therefore overlap in frequency with the synchronisation OFDM symbol. As shown in FIG. 6 in the two non-overlapping regions 506, 508, demodulation reference symbol 601 are transmitted whereas in the hatched region 504 no demodulation reference symbols are transmitted. According to this example therefore a channel transfer function or channel impulse response of the channel through which the OFDM symbols of the synchronisation block have passed is estimated differently between the two parts. The first part is the hatched region 504 which is estimated using the synchronisation sequence transmitted in the synchronisation OFDM symbol 502. In contrast the channel is estimated for the non-overlapping regions 506, 508 from the demodulation reference symbols 601 transmitted in these regions of the PBCH OFDM symbol 504.

In a first embodiment, no DMRS are included in the hatched portion of the PBCH. DMRS are only included in the non-overlapping part either side of the overlapping or hatched portion 405. In this embodiment, the overlapping part of the PBCH uses the synchronisation sequence carried by the synchronisation OFDM symbol(s) as reference signals for channel estimation whilst the non-hatched portions uses the multiplexed DMRS for channel estimation. The receiver can smooth between the separate channel estimates using filtering or interpolation. An advantage of this example is that the REs that would have been used for DMRS in the overlapping part are used instead for carrying PBCH signalling payload thereby increasing PBCH spectral efficiency or robustness It will also be appreciated that it is not necessary for the synchronisation OFDM signal to overlap in frequency only with the middle band of the PBCH OFDM symbol. It can also be located to one side.

Neither does it have to fully overlap. In some examples the PBCH OFDM symbol is only partially overlapped with the synchronisation OFDM symbol. In such a system, the smoothing between the two channel estimates will be different but it can still be achieved with filtering and extrapolation or interpolation.

In some example embodiments the same antenna ports and beam forming weight vectors can be applied to the synchronisation signal (synchronisation OFDM symbol) and the PBCH OFDM symbol in the overlapping part. In the non-overlapping part, a different antenna port mapping and different beam forming weight vectors can be applied (different to the mapping applied in the overlapping part). This has an advantages of reducing the constraints on the beam forming that can be applied to the PBCH and of increasing the beam forming diversity within the PBCH.

Mixed Reference Symbols for PBCH

As explained above, the effectiveness of the synchronisation signal as a suitable reference symbol for channel estimation can be limited by the relative speed of movement between the UE and the gNodeB. Similarly, the level to which a given speed of movement can influence this efficacy also depends on the OFDM symbol duration which in turn depends on the sub-carrier spacing (SCS) used for transmission. When the SCS is halved for example, the symbol duration doubles and so it can be expected that the efficacy of using the synchronisation signal for channel estimation is similarly halved for the same relative speed. In one embodiment therefore, some DMRS are added to the PBCH OFDM symbol in the overlapping part. When present, the receiver can use time interpolation between the channel estimate derived from the synchronisation signal and that derived from this DMRS to maintain the efficacy of channel estimation. Furthermore, this additional DMRS do not have to be as dense as those in the non-overlapping part because of the time interpolation that can be used to increase density at the UE. So for example, the DMRS in the overlapping part may be only half or less of the density of those in the non-hashed regions as illustrated in FIG. 7.

Figure 7:
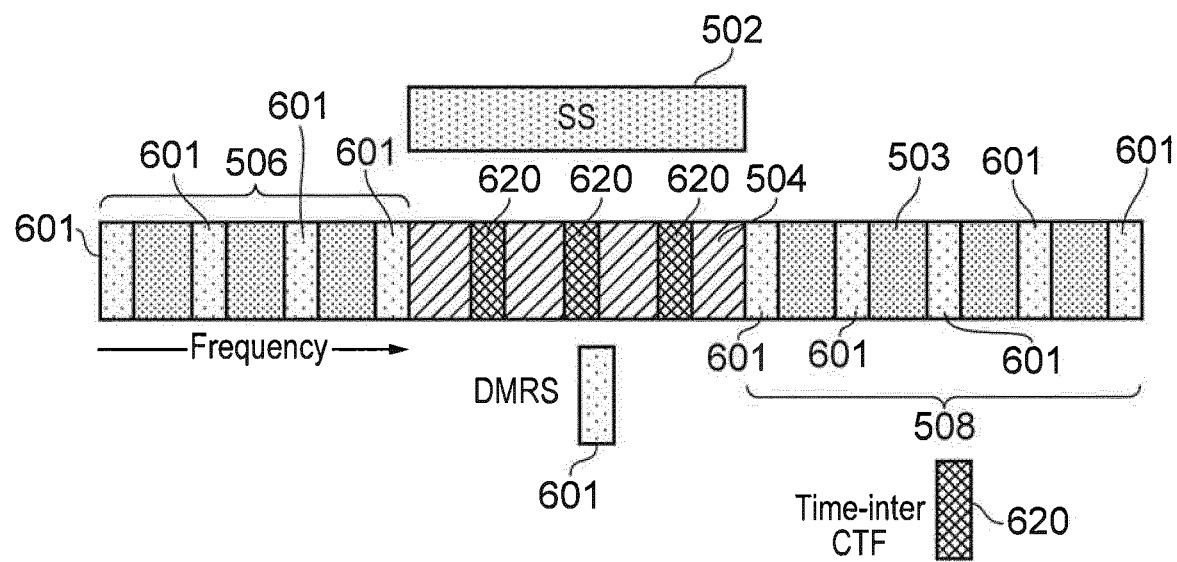
FIG. 7 is a schematic representation of an OFDM symbol carrying a physical broadcast channel (PBCH) information and an OFDM symbol carrying a synchronisation signal in which a region of frequencies of the OFDM PBCH symbol which overlaps those of the synchronisation OFDM symbol contain a different arrangement of reference symbols to those frequencies which do not overlap the OFDM synchronisation signal.

A further example is illustrated in FIG. 7 which corresponds to the diagram shown in FIG. 6. However, as shown in FIG. 7 demodulation reference symbols 620 are also transmitted within the overlap or hatched region 504 as well as the non-overlapping region 601, 506, 508. According to the present technique therefore the channel transfer function for the overlap portion is estimated using a time interpolation between samples generated from demodulation reference symbols 620 transmitted in the overlap region and the samples generated from the synchronisation OFDM symbols in which sub carriers are transmitted in common frequencies prior to frequency interpolation with the channel transfer function elements estimated from the demodulation reference symbols transmitted in the non-overlap region.

Figure 8:
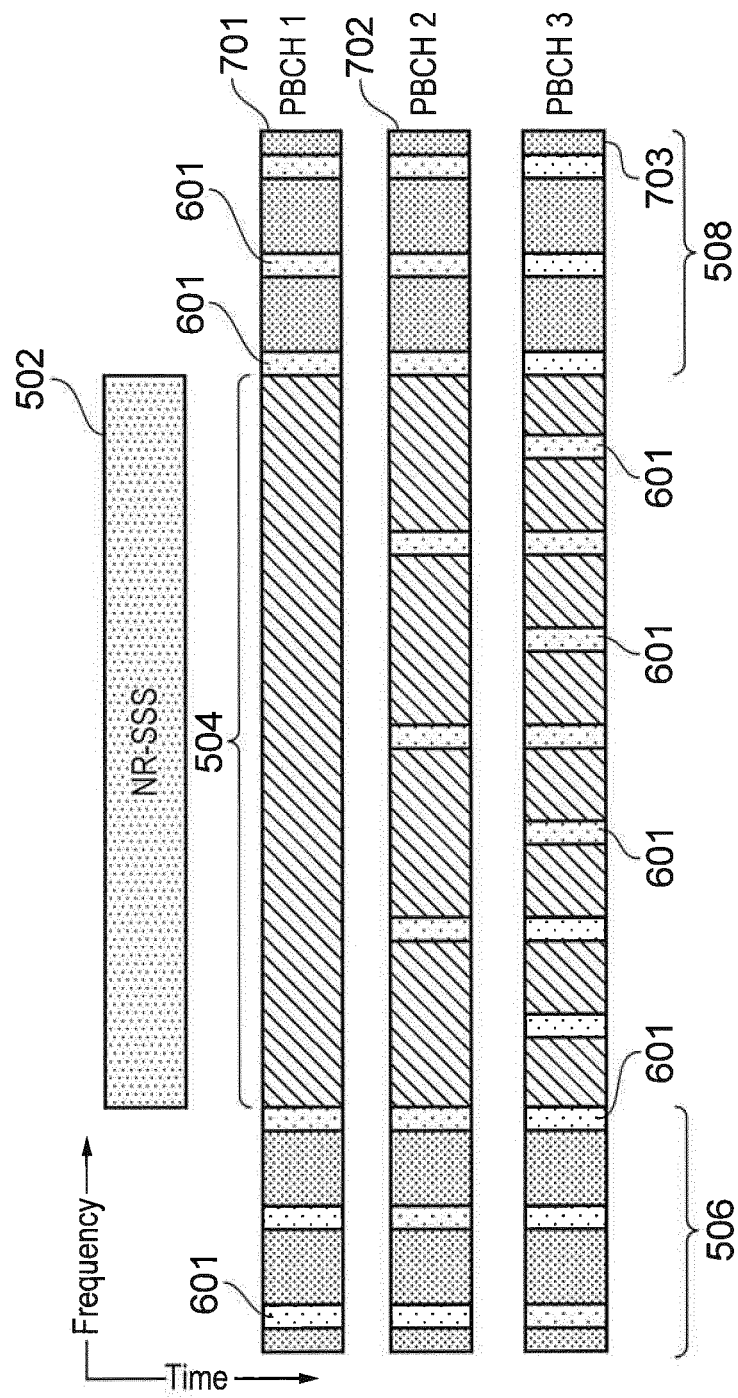
FIG. 8 is a schematic representation of a further example of a synchronisation signal block comprised of three OFDM symbols carrying a physical broadcast channel (PBCH) information and an OFDM symbol carrying a synchronisation signal.

As a further example embodiment, FIG. 8 provides an example in which the PBCH information is carried by three OFDM symbols 701, 702, 703, which are transmitted in sequence after the synchronisation OFDM symbol, which carries the synchronisation sequence. As shown in FIG. 8, a ratio of the number of demodulation reference symbols to sub-carriers for the overlapping parts 504 is dependent on a temporal proximity of each of the three PBCH OFDM symbols 701, 702, 703 carrying the physical broadcast channel information to the synchronisation signal OFDM symbol. This is because the effectiveness of the synchronisation signal as a suitable reference symbol for channel estimation for demodulating each of the PBCH OFDM symbols reduces as the temporal proximity of the PBCH OFDM symbol from the synchronisation signal OFDM symbol increases. As illustrated in FIG. 8, the first PBCH OFDM symbol 701 following the synchronisation OFDM symbols 502 carries no demodulation reference symbols in the overlapping part 504. Thereafter each of the subsequently transmitted PBCH OFDM symbols 702, 703 carry an increasing density or ratio of demodulation reference symbols to sub-carrier signals in the overlapping region 504.

As will be appreciated the demodulation reference symbols provide sub-carriers which are carrying a known amplitude and phase which can be used at the receiver to estimate a sample of the channel transfer function.

Example Transmitter and Receiver

Figure 9:
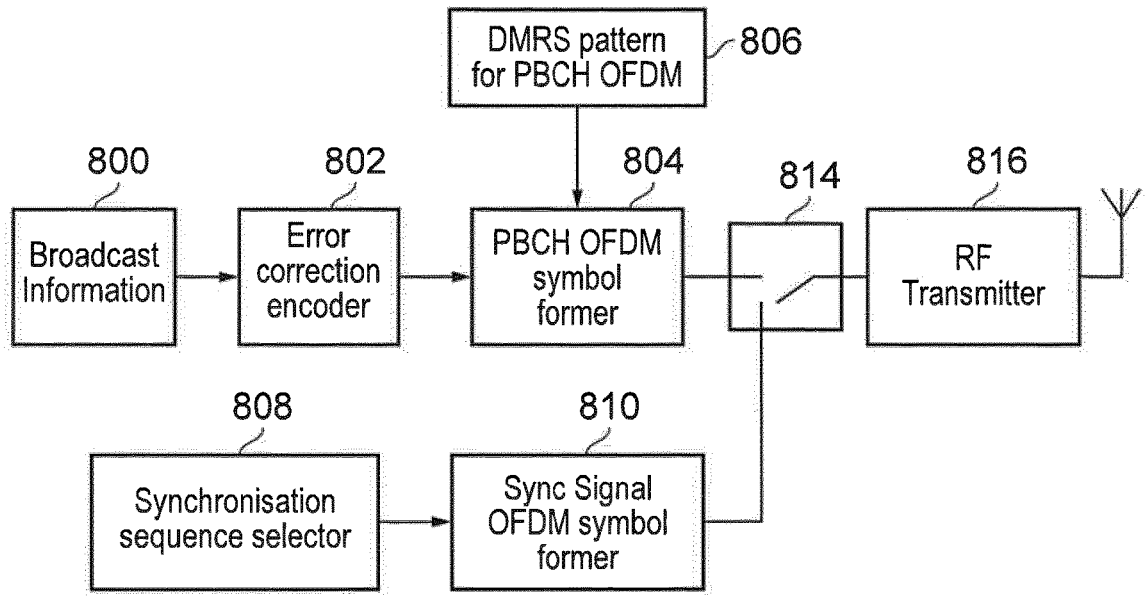
FIG. 9 is a schematic block diagram illustrating an arrangement of a transmitter which may form part of a base station shown in FIG. 1, 2 or 3.

FIG. 9 provides a schematic block diagram of a transmitter which is configured to transmit a synchronisation signal block in accordance with the present technique. As shown in FIG. 9 broadcast system information for transmission to a communications device is generated within a first block 800 and fed to an error correction encoder 802. The error correction encoder 802 performs an error correction encoding process in which redundant information is added to the information representing the broadcast system information in accordance with an error correction scheme (block or convolution encoding). In some examples a cyclic redundancy check (CRC) may be added to confirm the integrity of the information at the receiver. As explained below, in some examples more than one code word may be used such as for example two code words, one encoding system information for transmission in the overlap region and the other encoding system information for transmitting in the non-overlap region. Since the channel estimate in the overlap region will be better than in the non-overlap region, an amount of redundancy of the error correction code used for the non overlap region may be increased in order to equalise the transmission integrity across the broadcast system information.

The error correction encoded broadcast system information is then received by a PBCH OFDM symbol former 804. The PBCH OFDM symbol former 804 receives a pattern of demodulation reference symbols to form one of the example OFDM symbols for carrying the broadcast system information as shown in FIGS. 5, 6 and 7. The pattern of DMRS reference symbols for the PBCH OFDM symbols are fed from the block 806 to the PBCH OFDM symbol former which generates the one or more PBCH OFDM symbols for transmission. In parallel a synchronisation sequence for forming the synchronisation OFDM symbol is generated by a synchronisation sequence selector 808 which is fed to a synchronisation signal OFDM signal former 810. The synchronisation OFDM symbol former 810 combines the selected synchronisation sequence into the synchronisation OFDM symbol to form the synchronisation OFDM symbol for transmission. A multiplexer 814 then receives the synchronisation OFDM symbol sequentially with the one or more PBCH OFDM symbols for transmission from an RF transmitter 816 to provide the temporally separate transmission of the synchronisation OFDM symbol followed by the one or more PBCH OFDM symbols.

Figure 10:
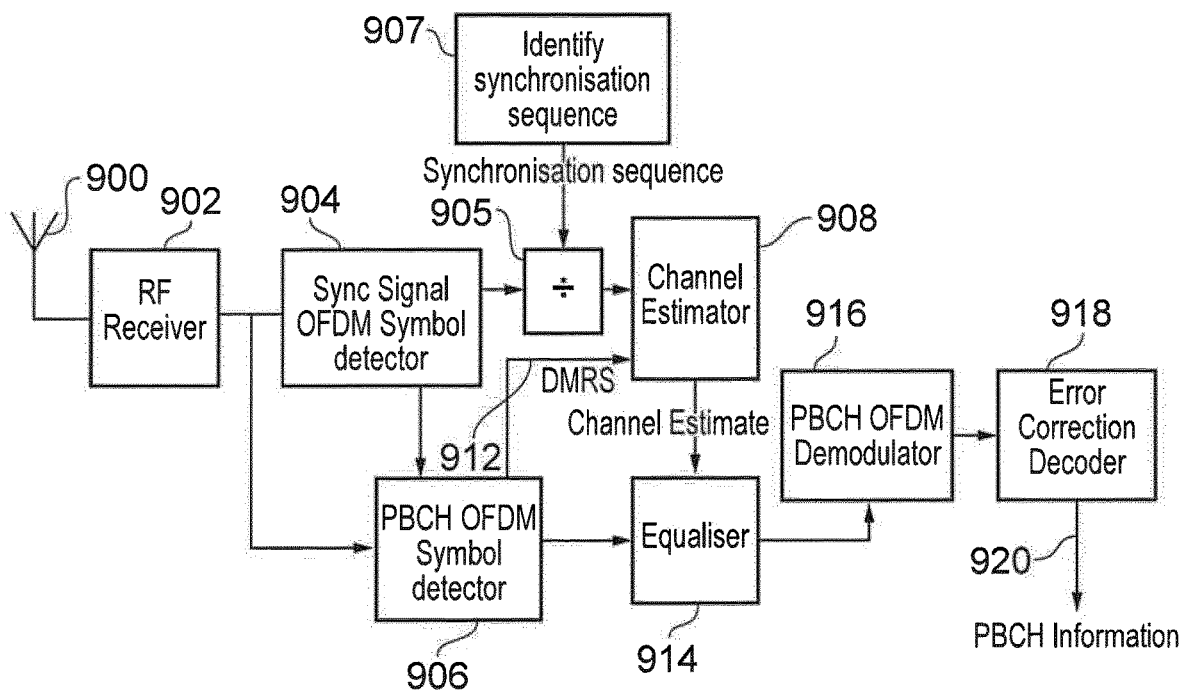
FIG. 10 is a schematic block diagram of a receiver for detecting and recovering information from, for example, a physical broadcast channel in accordance with an embodiment of the present technique, which may form part of a wireless communications device.

FIG. 10 provides a schematic block diagram of a receiver. As shown in FIG. 10 a receive antenna 900 feeds a detected radio frequency signal to a radio frequency receiver 902, which isolates the desired signal. A synchronisation OFDM symbol detector 904 and the PBCH OFDM symbol detector 906 then serve to detect sequentially the synchronisation OFDM symbol and the one or more PBCH OFDM symbols respectively. The synchronisation signal OFDM detector 904 generates an estimate of the synchronisation sequence carried by the synchronisation OFDM symbol and feeds the estimated synchronisation sequence to the divider 905. A synchronisation sequence generator 907 identifies one of a plurality of possible synchronisation sequences which may have been included in the synchronisation OFDM symbol and feeds the identified synchronisation sequence to a second input of the divider circuit 905. The divider circuit 905 then divides the received synchronisation signal of the synchronisation OFDM symbol by the synchronisation sequence identified by the synchronisation sequence generator 907 to generate an estimate of the channel transfer function in a frequency range corresponding to the overlapping part of the PBCH OFDM symbol. This part of the channel estimate is fed to the channel estimator 908.

For the channel transfer function corresponding to the non-overlapping part of the PBCH OFDM symbols, the PBCH OFDM symbols detector 906 recovers the demodulation reference symbols carried in the non-overlapping part and feeds these via a connecting channel 912 to the channel estimator 908. The channel estimator 908 then serves to generate an estimate of the channel transfer function in the frequency domain from the recovered demodulation reference symbols from the non-overlapping part by comparing these with replicas known at the receiver having a predetermined amplitude and phase to generate for each demodulation reference symbol a sample of the channel transfer function. The channel estimator 908 then combines the estimate of the channel transfer function for the over-lapping part of each PBCH OFDM symbol from the estimated from the synchronisation OFDM symbol with the part of the channel transfer function corresponding to the non-overlapping part generated from the recovered demodulation reference symbols to generate an estimate of the channel transfer function for all of the PBCH OFDM symbol. The channel transfer function is then fed to an equaliser 914 which removes the effect of the channel from the detected OFDM symbol 906. The equalised PBCH OFDM symbol is then fed to a PBCH OFDM demodulator 916 which demodulates the all the one or more PBCH OFDM symbols to recover error correction encoded broadcast information carried by the PBCH OFDM symbols.

An error correction decoder 918 then performs an error correction decoding process on the encoded information carried by the PBCH and to provide the broadcast system information on the output 920.

In some examples the channel estimator 908 performs time interpolation between the samples of the channel transfer function estimated from the demodulation reference symbols and those estimated from the synchronisation sequence of the synchronisation OFDM symbol.

Variable Rate Matching

In some embodiments, the PBCH is formed of more than one code block (e.g. the PBCH is formed of two code blocks). A code block consists of a forward error correction codeword (usually appended with a CRC, although it is also possible for two code blocks to be protected by a single CRC). The rate matching parameters of the code block that is mapped to the overlapping part results in a higher code rate and less powerful coding for the information carried by this code block (compared to the code rate applied to the code block that is mapped to the non-overlapping portion). This allows a reliability of the two code blocks to be equalized (noting that the increase in coding rate in the overlapped region is compensated for by an improvement in channel estimation reliability in that region).

Mapping Based on Priority

In some embodiments, a density of the DMRS within the PBCH is uniform (i.e. there is no DMRS density difference between the overlap and non-overlap regions of the PBCH OFDM symbol), but the choice of which data is mapped to the overlapping region is made based on priority information. According to these example embodiments, highest priority information, such as systematic bits of a PBCH codeword can be assigned to a most reliable portion of the PBCH. Again, the PBCH may be formed of more than one code block (e.g. a CB for lower priority data and a CB for higher priority data). The code block with higher priority data is mapped to the overlapping region (that is more reliable) and the code block with lower priority data is mapped to the non-overlapping region. In this case, both code blocks adopt the same rate matching pattern.

Example information that could be transmitted in the higher priority code block could include one or more of the following:
- emergency warning data (e.g. a flag that indicates whether an earthquake or tsunami is going to occur within the region occupied by the cell or beam)
- flags indicating whether there has been a change in MIB (or SIB) contents
- system frame number information
- time or beam index indication (allowing UEs to determine the timing of the beam, hence allowing the UE to determine the beam ID. It may be desirable for the UE to be able to easily and robustly decode such information when performing mobility measurements).

Other information could be carried in the lower priority code block (for example information allowing other SIBs to be received could be transmitted in the lower priority code block, since this information only needs to be decoded in the infrequent case that there is a change in MIB or SIB configuration). Note that the mapping of which bits are applied to high reliability portions and which bits are applied to low reliability portions is likely to be predefined.

DMRS Sequences

Figure 11:
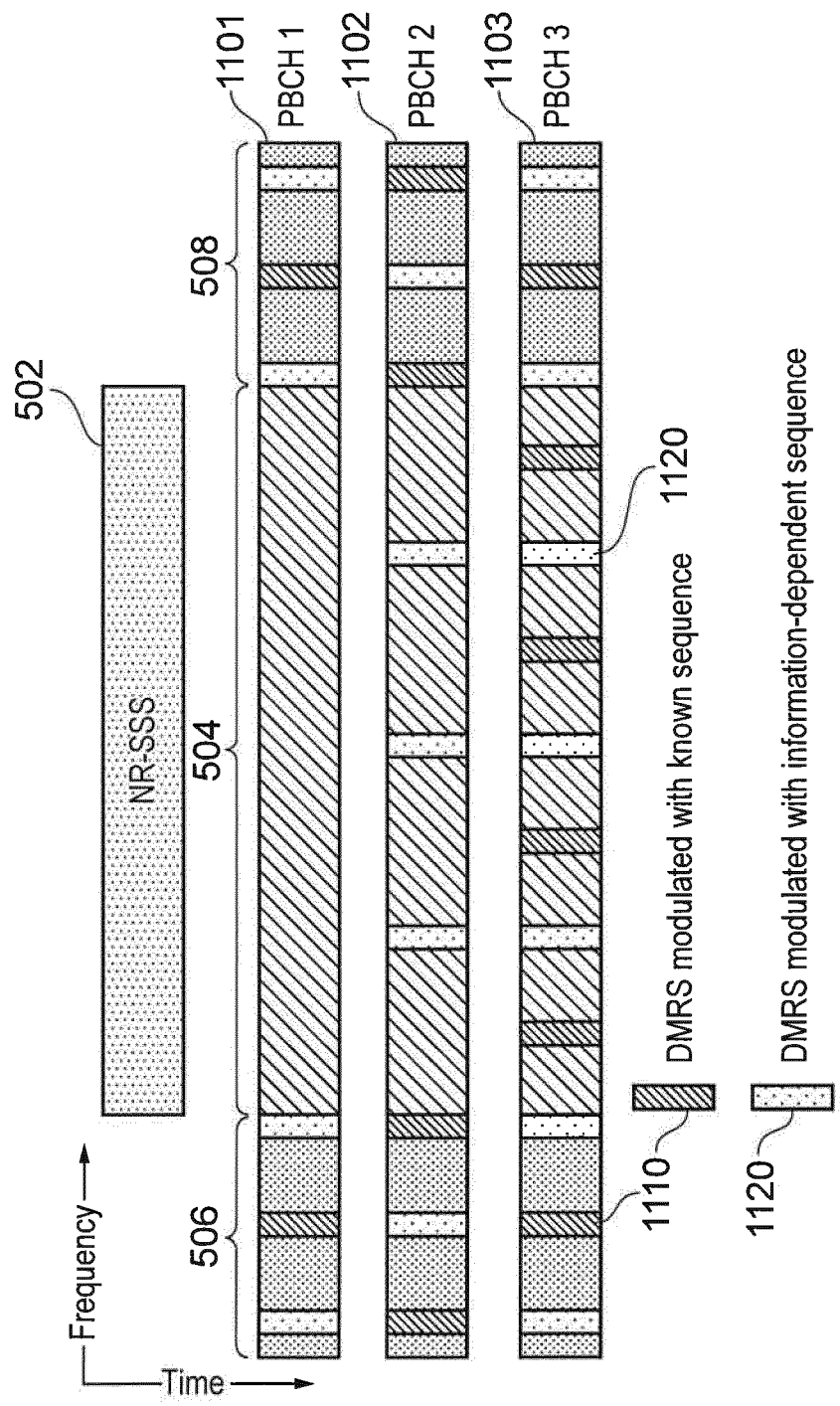
FIG. 11 is a schematic representation of a further example of a synchronisation signal block comprised of three OFDM symbols carrying a physical broadcast channel (PBCH) information and an OFDM symbol carrying a synchronisation signal.

In some embodiments, as illustrated in FIG. 11, some of the DMRS resource elements can be used to carry signalling information from the gNodeB to the UEs, while other DMRS resource elements can carry a known sequence.

As can be seen in the example of FIG. 11, similarly to FIG. 8, the PBCH information is carried by three OFDM symbols 1101, 1102, 1103, which are transmitted in sequence after the synchronisation OFDM symbol. As illustrated in FIG. 11, the first PBCH OFDM symbol 1101 following the synchronisation OFDM symbol 502 carries no demodulation reference symbols in the overlapping part 504. Thereafter each of the subsequently transmitted PBCH OFDM symbols 1102, 1103 carry an increasing density or ratio of demodulation reference symbols to sub-carrier signals in the overlapping region 504.

The demodulation reference symbols form two distinct groups; those which are modulated with the known sequence 1110 which is a sequence known to both the gNodeB and the UE, and those which are modulated with an information-dependent sequence 1120 which conveys signalling information between the gNodeB and the UE.

In other words, in these embodiments, a first group of the demodulation reference symbols carry signalling information, and a second group of the demodulation reference symbols carry a known sequence, the known sequence being known to both the wireless communications device and the infrastructure equipment, the first group of the demodulation reference symbols being distinct from the second group of demodulation reference symbols.

The second group of DMRS modulated with the known sequence can be used at the UE to generate the estimate of the channel transfer function used for the decoding of the signalling information carried by the first group of the demodulation reference symbols. Examples of the information that can be carried on the first group of the PBCH DMRS is the synchronisation signal (SS) block time index, which represents a cardinal number of the detected synchronisation signal block.

As will be appreciated embodiments of the present technique are not limited to transmitting information on a physical broadcast channel but can be applied to transmit control information in which a synchronisation OFDM symbol is transmitted before an OFDM symbol carrying that control information and inn which some of the frequencies of the carrier signals in each of the OFDM symbols are common.

The following numbered paragraphs provide further example aspects and features of the present technique:

Paragraph 1. A wireless communications device for transmitting or receiving data via a wireless communications network, the wireless communications device comprising
transmitter circuitry configured to transmit radio signals via a wireless access interface to an infrastructure equipment forming a radio network part of the wireless communications network,
receiver circuitry configured to receive radio signals transmitted from the infrastructure equipment via the wireless access interface, and
controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry
to detect a synchronisation signal block transmitted by the infrastructure equipment via the wireless access interface, the synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols, to generate an estimate of a channel transfer function through which the detected synchronisation signal block has passed, and to decode the physical broadcast channel information using the estimated channel transfer function to equalise the one or more other OFDM symbols carrying the information of a physical broadcast channel of the wireless access interface, wherein the receiver circuitry is configured to generate the estimate of the channel transfer function using either or both the resource elements of the OFDM symbol carrying the synchronisation sequence in the synchronisation signal or by using the demodulation reference symbols received in the OFDM symbol carrying the physical broadcast channel information.

Paragraph 2. A wireless communications device according to paragraph 1, wherein the OFDM symbol carrying the synchronisation signal and the one or more OFDM symbols carrying the physical broadcast channel information overlap at least in part in the frequency domain with an effect that one or more sub-carriers are transmitted on the same frequency to form one or more frequency domain one or more overlapping parts of the one or more OFDM symbols carrying the physical broadcast channel information with the sub-carriers modulated with synchronisation sequence in the OFDM symbol carrying a synchronisation signal, and one or more other sub-carriers of the one or more OFDM symbols carrying the physical broadcast channel information forming frequency domain one or more non-overlapping parts are transmitted on frequencies that are different from the frequencies of the sub-carriers modulated with the synchronisation sequence in the OFDM symbol carrying the synchronisation signal.

Paragraph 3. A wireless communications device according to paragraph 2, wherein the one or more overlapping parts of the one or more OFDM symbols carrying the physical broadcast channel information contain no demodulation reference symbols and the one or more non-overlapping parts contain the demodulation reference symbols carried by the one or more OFDM symbols carrying the physical broadcast channel information, and the receiver circuitry is configured to generate the estimate of the channel transfer function using the synchronisation sequence received in the OFDM symbol carrying the synchronisation signal and using the demodulation reference symbols in the OFDM symbol carrying the physical broadcast channel information, by estimating a part of the channel transfer function corresponding to the one or more overlapping parts from the synchronisation sequence carried by the OFDM symbol carrying the synchronisation signal for sub-carriers corresponding to the one or more overlapping parts and by estimating the parts of the channel transfer function corresponding to the one or more non-overlapping parts from the demodulation reference symbols carried by the one or more OFDM symbols carrying the physical broadcast channel information.

Paragraph 4. A wireless communications device according to paragraph 2, wherein the one or more overlapping parts and the one or more non-overlapping parts of the one or more OFDM symbols carrying the physical broadcast channel information both include demodulation reference symbols, and the receiver circuitry is configured to generate the estimate of the channel transfer function using the demodulation reference symbols differently depending on whether the demodulation reference symbols were received from the one or more overlapping parts or received from the one or more non-overlapping parts of the one or more OFDM symbol carrying the physical broadcast channel information.

Paragraph 5. A wireless communications device according to paragraph 4, wherein the receiver circuitry is configured to generate for each of the one or more OFDM symbols carrying the physical broadcast channel information the estimate of the channel transfer function using the synchronisation sequence received in the OFDM symbol carrying the synchronisation signal and from the demodulation reference symbols carried by the one or more OFDM symbols carrying the physical broadcast channel information, by estimating a part of the channel transfer function corresponding to the one or more overlapping parts by performing time interpolation between samples of the channel transfer function generated from the synchronisation sequence carried by the OFDM symbol carrying the synchronisation signal and samples of the channel transfer function generated from demodulation reference symbols carried by the corresponding one of the one or more OFDM symbol carrying the physical broadcast channel information for sub-carriers corresponding to the one or more overlapping parts, and estimating a part of the channel transfer function corresponding to the one or more non-overlapping parts from demodulation reference symbols carried by the one or more non-overlapping parts of the corresponding one of the one or more OFDM symbol carrying the physical broadcast channel information.

Paragraph 6. A wireless communications device according to paragraph 4 or 5, wherein the demodulation reference symbols are distributed differently in each of the one or more OFDM symbols carrying the physical broadcast channel information between the one or more overlapping parts and the one or more non-overlapping parts.

Paragraph 7. A wireless communications device according to paragraph 6, wherein the ratio of the number of demodulation reference symbols to sub-carriers is greater for the one or more non-overlapping parts than the ratio of the number of demodulation reference symbols to sub-carriers for the one or more overlapping parts of the OFDM symbol carrying the physical broadcast channel information.

Paragraph 8. A wireless communications device according to paragraph 7, wherein the ratio of the number of demodulation reference symbols to sub-carriers for the one or more overlapping parts is dependent on the temporal proximity of each of the one or more OFDM symbols carrying the physical broadcast channel information and the OFDM symbol carrying the synchronisation signal with the ratio being lower or zero for the immediately following OFDM symbol carrying the physical broadcast channel information and increasing for subsequent OFDM symbols carrying the physical broadcast channel information.

Paragraph 9. A wireless communications device according to any of paragraphs 1 to 8, wherein the physical broadcast channel information is encoded with one or more error correction codes, and an amount of redundant data provided by the one or more error correction codes is less for the physical broadcast channel information carried by the sub-carriers of the overlapped parts than that carried by the sub-carriers in the non-overlapped parts, and the receiver circuitry includes error correction decoder circuitry configured to decode the encoded physical broadcast channel information differently depending on whether the encoded physical broadcast channel information was carried by subcarriers of the one or more OFDM symbols in the one or more overlapping parts or the one or more non-overlapping parts.

Paragraph 10. A wireless communications device according to paragraph 9, wherein the one or more error correction codes comprises two error correction codes a first of the error correction codes having been used to encode the physical broadcast channel information carried in the one or more overlapping parts of the one or more OFDM symbols and a second of the error correction codes having been used to encode the physical broadcast channel information carried in the one or more non-overlapping parts of the one or more OFDM symbols, and a code rate of the first error correction code for one or more overlapping parts is higher than a code rate of the second error correction code for the one or more non-overlapping parts.

Paragraph 11. A wireless communications device according to paragraph 9, wherein the physical broadcast channel information comprises information having a different priority, and higher priority physical broadcast channel information is carried by sub-carriers of the one or more overlapping parts of the one or more OFDM symbols.

Paragraph 12. A wireless communications device according to any of paragraphs 1 to 11, wherein the synchronisation block has been transmitted as a beam using a plurality of antennas, and a vector used to form the beam is the same used for both the synchronisation signal OFDM symbol and the one or more physical broadcast channel information OFDM symbols.

Paragraph 13. A wireless communications device according to any of paragraphs 1 to 11, wherein the receiver circuitry is configured to identify the synchronisation sequence carried in the OFDM symbol carrying a synchronisation signal as one of a plurality of possible synchronisation sequences.

Paragraph 14. A wireless communications device according to any of paragraphs 1 to 13, wherein a first group of the demodulation reference symbols carry signalling information, and a second group of the demodulation reference symbols carry a known sequence, the known sequence being known to both the wireless communications device and the infrastructure equipment, the first group of the demodulation reference symbols being distinct from the second group of demodulation reference symbols.

Paragraph 15. A wireless communications device according to paragraph 14, wherein the wireless communications device is configured to generate the estimate of the channel transfer function using the known sequence carried by the second group of the demodulation reference symbols.

Paragraph 16. A wireless communications device according to paragraph 15, wherein the wireless communications device is configured to decode the signalling information carried by the first group of the demodulation reference symbols using the estimate of the channel transfer function estimated using the known sequence.

Paragraph 17. A wireless communications device according to any of paragraphs 14 to 16, wherein the signalling information comprises a synchronisation signal block time index representing a cardinal number of the detected synchronisation signal block.

Paragraph 18. A method or transmitting or receiving data via a wireless communications network by a wireless communications device, the method comprising
  detecting a synchronisation signal block transmitted by the infrastructure equipment via the wireless access interface, the synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols,
  generating an estimate of a channel transfer function through which the detected synchronisation signal block has passed, and
  decoding the physical broadcast channel information using the estimated channel transfer function to equalise the one or more other OFDM symbols carrying the information of a physical broadcast channel of the wireless access interface, wherein the generating an estimate of a channel transfer function
  generating the estimate of the channel transfer function using either or both of the resource elements of the OFDM symbol carrying the synchronisation sequence in the synchronisation signal or by using the demodulation reference symbols received in the OFDM symbol carrying the physical broadcast channel information.

Paragraph 19. A method according to paragraph 18, wherein the OFDM symbol carrying the synchronisation signal and the one or more OFDM symbols carrying the physical broadcast channel information overlap at least in part in the frequency domain with an effect that one or more sub-carriers are transmitted on the same frequency to form one or more frequency domain one or more overlapping parts of the one or more OFDM symbols carrying the physical broadcast channel information with the sub-carriers modulated with synchronisation sequence in the OFDM symbol carrying a synchronisation signal, and one or more other sub-carriers of the one or more OFDM symbols carrying the physical broadcast channel information forming frequency domain one or more non-overlapping parts are transmitted on frequencies that are different from the frequencies of the sub-carriers modulated with the synchronisation sequence in the OFDM symbol carrying the synchronisation signal.

Paragraph 20. A method according to paragraph 19, wherein the one or more overlapping parts of the one or more OFDM symbols carrying the physical broadcast channel information contain no demodulation reference symbols and the one or more non-overlapping parts contain the demodulation reference symbols carried by the one or more OFDM symbols carrying the physical broadcast channel information, and the generating the estimate of the channel transfer function using the synchronisation sequence received in the OFDM symbol carrying the synchronisation signal and using the demodulation reference symbols in the OFDM symbol carrying the physical broadcast channel information comprises
  estimating a part of the channel transfer function corresponding to the one or more overlapping parts from the synchronisation sequence carried by the OFDM symbol carrying the synchronisation signal for sub-carriers corresponding to the one or more overlapping parts, and estimating the parts of the channel transfer function corresponding to the one or more non-overlapping parts from the demodulation reference symbols carried by the one or more OFDM symbols carrying the physical broadcast channel information.

Paragraph 21. A method according to paragraph 19, wherein the one or more overlapping parts and the one or more non-overlapping parts of the one or more OFDM symbols carrying the physical broadcast channel information both include demodulation reference symbols, and the generating the estimate of the channel transfer function using the synchronisation sequence received in the OFDM symbol carrying the synchronisation signal and using the demodulation reference symbols in the OFDM symbol carrying the physical broadcast channel information comprises generating the estimate of the channel transfer function using the demodulation reference symbols differently depending on whether the demodulation reference symbols were received from the one or more overlapping parts or received from the one or more non-overlapping parts of the one or more OFDM symbol carrying the physical broadcast channel information.

Paragraph 22. A method according to paragraph 21, wherein the generating for each of the one or more OFDM symbols carrying the physical broadcast channel information the estimate of the channel transfer function using the synchronisation sequence received in the OFDM symbol carrying the synchronisation signal and from the demodulation reference symbols carried by the one or more OFDM symbols carrying the physical broadcast channel information, comprises estimating a part of the channel transfer function corresponding to the one or more overlapping parts by performing time interpolation between samples of the channel transfer function generated from the synchronisation sequence carried by the OFDM symbol carrying the synchronisation signal and samples of the channel transfer function generated from demodulation reference symbols carried by the corresponding one of the one or more OFDM symbol carrying the physical broadcast channel information for sub-carriers corresponding to the one or more overlapping parts, and estimating a part of the channel transfer function corresponding to the one or more non-overlapping parts from demodulation reference symbols carried by the one or more non-overlapping parts of the corresponding one of the one or more OFDM symbol carrying the physical broadcast channel information.

Paragraph 23. A method according to paragraph 21 or 22, wherein the demodulation reference symbols are distributed differently in each of the one or more OFDM symbols carrying the physical broadcast channel information between the one or more overlapping parts and the one or more non-overlapping parts.

Paragraph 24. A method according to any of paragraphs 18 to 23, wherein a first group of the demodulation reference symbols carry signalling information, and a second group of the demodulation reference symbols carry a known sequence, the known sequence being known to both the wireless communications device and the infrastructure equipment, the first group of the demodulation reference symbols being distinct from the second group of demodulation reference symbols.

Paragraph 25. A method according to paragraph 24, comprising generating the estimate of the channel transfer function using the known sequence carried by the second group of the demodulation reference symbols.

Paragraph 26. A method according to paragraph 25, comprising decoding the signalling information carried by the first group of the demodulation reference symbols using the estimate of the channel transfer function estimated using the known sequence.

Paragraph 27. A method according to any of paragraphs 24 to 26, wherein the signalling information comprises a synchronisation signal block time index representing a cardinal number of the detected synchronisation signal block.

Paragraph 28. An infrastructure equipment for forming part of a radio network part of a wireless communications network, comprising transmitter circuitry configured to transmit radio signals via a wireless access interface, formed by the infrastructure equipment to one or more wireless communications devices, receiver circuitry configured to receive radio signals transmitted from the one or more wireless communications devices via the wireless access interface, and controller circuitry configured to control the transmitter circuitry and the receiver circuitry to transmit data carried by the radio signals to the one or more wireless communications devices and to receive data carried by the radio signals from the one or more wireless communications devices, the controller circuitry being configured with the transmitter circuitry to form a synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals transmitted over a duration of the OFDM symbol in a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols, and to transmit the synchronisation signal block to the one or more wireless communications devices for receiving the broadcast information provided by the physical broadcast channel.

Paragraph 29. An infrastructure equipment according to paragraph 28, wherein the OFDM symbol carrying the synchronisation signal and the one or more OFDM symbols carrying the physical broadcast channel information overlap at least in part in the frequency domain with an effect that one or more sub-carriers are transmitted on the same frequency to form one or more frequency domain one or more overlapping parts of the one or more OFDM symbols carrying the physical broadcast channel information with the sub-carriers modulated with synchronisation sequence in the OFDM symbol carrying a synchronisation signal, and one or more other sub-carriers of the one or more OFDM symbols carrying the physical broadcast channel information forming frequency domain one or more non-overlapping parts are transmitted on frequencies that are different from the frequencies of the sub-carriers modulated with the synchronisation sequence in the OFDM symbol carrying the synchronisation signal.

Paragraph 30. An infrastructure equipment according to paragraph 29, wherein the one or more overlapping parts of the one or more OFDM symbols carrying the physical broadcast channel information contain no demodulation reference symbols and the one or more non-overlapping parts contain the demodulation reference symbols carried by the one or more OFDM symbols carrying the physical broadcast channel information.

Paragraph 31. An infrastructure equipment according to paragraph 29, wherein the one or more overlapping parts and the one or more non-overlapping parts of the one or more OFDM symbols carrying the physical broadcast channel information both include demodulation reference symbols.

Paragraph 32. An infrastructure equipment according to paragraph 30 or 31, wherein the demodulation reference symbols are distributed differently in each of the one or more OFDM symbols carrying the physical broadcast channel information between the one or more overlapping parts and the one or more non-overlapping parts.

Paragraph 33. An infrastructure equipment according to paragraph 32, wherein the ratio of the number of demodulation reference symbols to sub-carriers is greater for the one or more non-overlapping parts than the ratio of the number of demodulation reference symbols to sub-carriers for the one or more overlapping parts of the OFDM symbol carrying the physical broadcast channel information.

Paragraph 34. An infrastructure equipment according to paragraph 33, wherein the ratio of the number of demodulation reference symbols to sub-carriers for the one or more overlapping parts is dependent on the temporal proximity of each of the one or more OFDM symbols carrying the physical broadcast channel information and the OFDM symbol carrying the synchronisation signal with the ratio being lower or zero for the immediately following OFDM symbol carrying the physical broadcast channel information and increasing for subsequent OFDM symbols carrying the physical broadcast channel information.

Paragraph 35. An infrastructure equipment according to any of paragraphs 28 to 34, wherein the physical broadcast channel information is encoded with one or more error correction codes, and an amount of redundant data provided by the one or more error correction codes is less for the physical broadcast channel information carried by the sub-carriers of the overlapped parts than that carried by the sub-carriers in the non-overlapped parts, and the receiver circuitry includes error correction decoder circuitry configured to decode the encoded physical broadcast channel information differently depending on whether the encoded physical broadcast channel information was carried by sub-carriers of the one or more OFDM symbols in the one or more overlapping parts or the one or more non-overlapping parts.

Paragraph 36. An infrastructure equipment according to paragraph 35, wherein the one or more error correction codes comprises two error correction codes a first of the error correction codes having been used to encode the physical broadcast channel information carried in the one or more overlapping parts of the one or more OFDM symbols and a second of the error correction codes having been used to encode the physical broadcast channel information carried in the one or more non-overlapping parts of the one or more OFDM symbols, and a code rate of the first error correction code for one or more overlapping parts is higher than a code rate of the second error correction code for the one or more non-overlapping parts.

Paragraph 37. An infrastructure equipment according to paragraph 36, wherein the physical broadcast channel information comprises information having a different priorities and the controller circuitry is configured with the transmitter circuitry to form the one or more OFDM symbols carrying the physical broadcast channel information with higher priority information carried by sub-carriers of the one or more overlapping parts of the one or more OFDM symbols.

Paragraph 38. An infrastructure equipment according to any of paragraphs 28 to 37, wherein the transmitter circuitry includes a plurality of antennas forming an antenna array and the controller circuitry is configured with the transmitter circuitry to transmit the synchronisation block as a beam using the plurality of antennas, and a vector used to form the beam is the same used for both the synchronisation signal OFDM symbol and the one or more physical broadcast channel information OFDM symbols.

Paragraph 39. An infrastructure equipment according to any of paragraphs 28 to 38, wherein the receiver circuitry is configured to identify the synchronisation sequence carried in the OFDM symbol carrying a synchronisation signal as one of a plurality of possible synchronisation sequences.

Paragraph 40. An infrastructure equipment according to any of paragraphs 28 to 38, wherein a first group of the demodulation reference symbols carry signalling information, and a second group of the demodulation reference symbols carry a known sequence, the known sequence being known to both the one or more wireless communications devices and the infrastructure equipment, the first group of the demodulation reference symbols being distinct from the second group of demodulation reference symbols.

Paragraph 41. An infrastructure equipment according to paragraph 40, wherein the signalling information comprises a synchronisation signal block time index representing a cardinal number of the synchronisation signal block.

Paragraph 42. A method of transmitting information from an infrastructure equipment for forming part of a radio network part of a wireless communications network, the method comprising forming a synchronisation signal blocks comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals transmitted over a duration of the OFDM symbol in a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols, and transmitting the synchronisation signal block to the one or more wireless communications devices for receiving the broadcast information provided by the physical broadcast channel.

Paragraph 43. A method according to paragraph 42, wherein the OFDM symbol carrying the synchronisation signal and the one or more OFDM symbols carrying the physical broadcast channel information overlap at least in part in the frequency domain with an effect that one or more sub-carriers are transmitted on the same frequency to form one or more frequency domain one or more overlapping parts of the one or more OFDM symbols carrying the physical broadcast channel information with the sub-carriers modulated with synchronisation sequence in the OFDM symbol carrying a synchronisation signal, and one or more other sub-carriers of the one or more OFDM symbols carrying the physical broadcast channel information forming frequency domain one or more non-overlapping parts are transmitted on frequencies that are different from the frequencies of the sub-carriers modulated with the synchronisation sequence in the OFDM symbol carrying the synchronisation signal.

Paragraph 44. A method according to paragraph 43, wherein the one or more overlapping parts of the one or more OFDM symbols carrying the physical broadcast channel information contain no demodulation reference symbols and the one or more non-overlapping parts contain the demodulation reference symbols carried by the one or more OFDM symbols carrying the physical broadcast channel information.

Paragraph 45. A method according to paragraph 43, wherein the one or more overlapping parts and the one or more non-overlapping parts of the one or more OFDM symbols carrying the physical broadcast channel information both include demodulation reference symbols.

Paragraph 46. A method according to paragraph 43, wherein the demodulation reference symbols are distributed differently in each of the one or more OFDM symbols carrying the physical broadcast channel information between the one or more overlapping parts and the one or more non-overlapping parts.

Paragraph 47. A method according to paragraph 42, wherein a first group of the demodulation reference symbols carry signalling information, and a second group of the demodulation reference symbols carry a known sequence, the known sequence being known to both the one or more wireless communications devices and the infrastructure equipment, the first group of the demodulation reference symbols being distinct from the second group of demodulation reference symbols.

Paragraph 48. A method according to paragraph 47, wherein the signalling information comprises a synchronisation signal block time index representing a cardinal number of the synchronisation signal block.

Paragraph 49. A user equipment circuit comprising
transmitter circuitry configured to transmit radio signals via a wireless access interface to an infrastructure equipment forming a radio network part of the wireless communications network,
receiver circuitry configured to receive radio signals transmitted from the infrastructure equipment via the wireless access interface, and
controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry
to detect a synchronisation signal block transmitted by the infrastructure equipment via the wireless access interface, the synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols,
to generate an estimate of a channel transfer function through which the detected synchronisation signal block has passed, and
to decode the physical broadcast channel information using the estimated channel transfer function to equalise the one or more other OFDM symbols carrying the information of a physical broadcast channel of the wireless access interface, wherein
the receiver circuitry is configured to generate the estimate of the channel transfer function using either or both the resource elements of the OFDM symbol carrying the synchronisation sequence in the synchronisation signal or by using the demodulation reference symbols received in the OFDM symbol carrying the physical broadcast channel information.

Paragraph 50. A wireless communications device for transmitting or receiving data via a wireless communications network, the wireless communications device comprising
transmitter circuitry configured to transmit radio signals via a wireless access interface to an infrastructure equipment forming a radio network part of the wireless communications network,
receiver circuitry configured to receive radio signals transmitted from the infrastructure equipment via the wireless access interface, and
controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry
to detect a synchronisation signal block transmitted by the infrastructure equipment via the wireless access interface, the synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the one or more other OFDM symbols carrying information of a physical broadcast channel of the wireless access interface being arranged to include a first group of demodulation reference symbols carrying signalling information and a second group of demodulation reference symbols carrying a known sequence, the known sequence being known to both the wireless communications device and the infrastructure equipment, the first group of the demodulation reference symbols being distinct from the second group of demodulation reference symbols,
to generate a first estimate of a channel transfer function through which the detected synchronisation signal block has passed using the known sequence carried by the second group of the demodulation reference symbols,
to demodulate the first group of demodulation reference symbols using the first estimate of the channel transfer function,
to generate a second estimate of the channel transfer function using the resource elements of the OFDM symbol carrying the synchronisation sequence in the synchronisation signal and the first group of the demodulation reference symbols and the second group of the demodulation reference signals received in the OFDM symbol carrying the physical broadcast channel information, and to decode the physical broadcast channel information using the estimated channel transfer function to equalise the one or more other OFDM symbols carrying the information of a physical broadcast channel of the wireless access interface.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-170847, "New WID on New Radio Access Technology," NTT DOCOMO, RAN #75.

What is claimed is:

1. A wireless communications device for transmitting or receiving data via a wireless communications network, the wireless communications device comprising:
transmitter circuitry configured to transmit radio signals via a wireless access interface to an infrastructure equipment forming a radio network part of the wireless communications network,
receiver circuitry configured to receive radio signals transmitted from the infrastructure equipment via the wireless access interface, and
controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry;
to detect a synchronisation signal block transmitted by the infrastructure equipment via the wireless access interface, the synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols,
wherein the OFDM symbol carrying the synchronisation signal and the one or more OFDM symbols carrying the physical broadcast channel information overlap at least in part in the frequency domain, wherein the one or more overlapping parts and the one or more non-overlapping parts of the one or more OFDM symbols carrying the physical broadcast channel information both include demodulation reference symbols, and the receiver circuitry is configured to generate an estimate of the channel transfer function using the demodulation reference symbols differently depending on whether the demodulation reference symbols were received from the one or more overlapping parts or received from the one or more non-overlapping parts of the one or more OFDM symbol carrying the physical broadcast channel information,
wherein the overlap has an effect that one or more sub-carriers are transmitted on the same frequency to form one or more frequency domain one or more overlapping parts of the one or more OFDM symbols carrying the physical broadcast channel information with the sub-carriers modulated with synchronisation sequence in the OFDM symbol carrying a synchronisation signal, and one or more other sub-carriers of the one or more OFDM symbols carrying the physical broadcast channel information forming frequency domain one or more non-overlapping parts are transmitted on frequencies that are different from the frequencies of the sub-carriers modulated with the synchronisation sequence in the OFDM symbol carrying the synchronisation signal;
to generate an estimate of a channel transfer function through which the detected synchronisation signal block has passed, and
to decode the physical broadcast channel information using the estimated channel transfer function to equalise the one or more other OFDM symbols carrying the information of a physical broadcast channel of the wireless access interface, wherein the receiver circuitry is configured to generate the estimate of the channel transfer function using either or both the resource elements of the OFDM symbol carrying the synchronisation sequence in the synchronisation signal or by using the demodulation reference symbols received in the OFDM symbol carrying the physical broadcast channel information.

2. The wireless communications device as claimed in claim 1, wherein the receiver circuitry is configured to generate for each of the one or more OFDM symbols carrying the physical broadcast channel information the estimate of the channel transfer function using the synchronisation sequence received in the OFDM symbol carrying the synchronisation signal and from the demodulation reference symbols carried by the one or more OFDM symbols carrying the physical broadcast channel information, by
 estimating a part of the channel transfer function corresponding to the one or more overlapping parts by performing time interpolation between samples of the channel transfer function generated from the synchronisation sequence carried by the OFDM symbol carrying the synchronisation signal and samples of the channel transfer function generated from demodulation reference symbols carried by the corresponding one of the one or more OFDM symbol carrying the physical broadcast channel information for sub-carriers corresponding to the one or more overlapping parts, and
 estimating a part of the channel transfer function corresponding to the one or more non-overlapping parts from demodulation reference symbols carried by the one or more non-overlapping parts of the corresponding one of the one or more OFDM symbol carrying the physical broadcast channel information.

3. The wireless communications device as in claim 1, wherein the demodulation reference symbols are distributed differently in each of the one or more OFDM symbols carrying the physical broadcast channel information between the one or more overlapping parts and the one or more non-overlapping parts.

4. The wireless communications device as in claim 3, wherein the ratio of the number of demodulation reference symbols to sub-carriers is greater for the one or more non-overlapping parts than the ratio of the number of demodulation reference symbols to sub-carriers for the one or more overlapping parts of the OFDM symbol carrying the physical broadcast channel information.

5. The wireless communications device as in claim 4, wherein the ratio of the number of demodulation reference symbols to sub-carriers for the one or more overlapping parts is dependent on the temporal proximity of each of the one or more OFDM symbols carrying the physical broadcast channel information and the OFDM symbol carrying the synchronisation signal with the ratio being lower or zero for the immediately following OFDM symbol carrying the physical broadcast channel information and increasing for subsequent OFDM symbols carrying the physical broadcast channel information.

6. The wireless communications device as in claim 1, wherein the physical broadcast channel information is encoded with one or more error correction codes, and an amount of redundant data provided by the one or more error correction codes is less for the physical broadcast channel information carded by the sub-carriers of the overlapped parts than that carried by the sub-carriers in the non-overlapped parts, and the receiver circuitry includes error correction decoder circuitry configured to decode the encoded physical broadcast channel information differently depending on whether the encoded physical broadcast channel information was carried by sub-carriers of the one or more OFDM symbols in the one or more overlapping parts or the one or more non-overlapping parts.

7. The wireless communications device as in claim 6, wherein the one or more error correction codes comprises two error correction codes a first of the error correction codes having been used to encode the physical broadcast channel information carried in the one or more overlapping parts of the one or more OFDM symbols and a second of the error correction codes having been used to encode the physical broadcast channel information carried in the one or more non-overlapping parts of the one or more OFDM symbols, and a code rate of the first error correction code for one or more overlapping parts is higher than a code rate of the second error correction code for the one or more non-overlapping parts.

8. The wireless communications device as in claim 6, wherein the physical broadcast channel information comprises information having a different priority, and higher priority physical broadcast channel information is carried by sub-carriers of the one or more overlapping parts of the one or more OFDM symbols.

9. The wireless communications device as in claim 1, wherein the synchronisation block has been transmitted as a beam using a plurality of antennas, and a vector used to form the beam is the same used for both the synchronisation signal OFDM symbol and the one or more physical broadcast channel information OFDM symbols.

10. The wireless communications device as in claim 1, wherein the receiver circuitry is configured to identify the synchronisation sequence carried in the OFDM symbol carrying a synchronisation signal as one of a plurality of possible synchronisation sequences.

11. The wireless communications device as in claim 1, wherein a first group of the demodulation reference symbols carry signalling information, and a second group of the demodulation reference symbols carry a known sequence, the known sequence being known to both the wireless communications device and the infrastructure equipment, the first group of the demodulation reference symbols being distinct from the second group of demodulation reference symbols.

12. The wireless communications device as in claim 11, wherein the wireless communications device is configured to generate the estimate of the channel transfer function using the known sequence carried by the second group of the demodulation reference symbols.

13. The wireless communications device as in claim 12, wherein the wireless communications device is configured to decode the signalling information carried by the first group of the demodulation reference symbols using the estimate of the channel transfer function estimated using the known sequence.

14. The wireless communications device as in claim 11, wherein the signalling information comprises a synchronisation signal block time index representing a cardinal number of the detected synchronisation signal block.

15. An infrastructure equipment for forming part of a radio network part of a wireless communications network, comprising:
 transmitter circuitry configured to transmit radio signals via a wireless access interface, formed by the infrastructure equipment to one or more wireless communications devices, receiver circuitry configured to receive radio signals transmitted from the one or more wireless communications devices via the wireless access interface, and controller circuitry configured to control the transmitter circuitry and the receiver circuitry to transmit data carried by the radio signals to the one or more wireless communications devices and to receive data carried by the radio signals from the one or more wireless communications devices, the controller circuitry being configured with the transmitter circuitry;

to form a synchronisation signal block comprising one or more Orthogonal Frequency Division Multiplexed, OFDM, symbols carrying a synchronisation sequence and one or more other OFDM symbols carrying information of a physical broadcast channel of the wireless access interface, each of the OFDM symbols of the synchronisation block being formed by a plurality of frequency domain sub-carrier signals transmitted over a duration of the OFDM symbol in a resource element of the wireless access interface, each OFDM symbol of the synchronisation signal block having the same sub-carrier spacing, and each of the one or more other OFDM symbols carrying information of a physical broadcast channel of the wireless access interface being arranged to include demodulation reference symbols, wherein the OFDM symbol carrying the synchronisation signal and the one or more OFDM symbols carrying the physical broadcast channel information overlap at least in part in the frequency domain, wherein the one or more overlapping parts and the one or more non-overlapping parts of the one or more OFDM symbols carrying the physical broadcast channel information both include demodulation reference symbols, and an estimate of the channel transfer function is generated differently using the demodulation reference symbols depending on whether the demodulation reference symbols were transmitted in the one or more overlapping parts or transmitted in the one or more non-overlapping parts of the one or more OFDM symbol carrying the physical broadcast channel information, wherein the overlap has an effect that one or more sub-carriers are transmitted on the same frequency to form one or more frequency domain one or more overlapping parts of the one or more OFDM symbols carrying the physical broadcast channel information with the sub-carriers modulated with synchronisation sequence in the OFDM symbol carrying a synchronisation signal, and one or more other sub-carriers of the one or more OFDM symbols carrying the physical broadcast channel information forming frequency domain one or more non-overlapping parts are transmitted on frequencies that are different from the frequencies of the sub-carriers modulated with the synchronisation sequence in the OFDM symbol carrying the synchronisation signal;

and to transmit the synchronisation signal block to the one or more wireless communications devices for receiving the broadcast information provided by the physical broadcast channel.

16. The infrastructure equipment as in claim claim 15, wherein the transmitter circuitry includes a plurality of antennas forming an antenna array and the controller circuitry is configured with the transmitter circuitry to transmit the synchronisation block as a beam using the plurality of antennas, and a vector used to form the beam is the same used for both the synchronisation signal OFDM symbol and the one or more physical broadcast channel information OFDM symbols.

17. The infrastructure equipment as in claim claim 15, wherein the receiver circuitry is configured to identify the synchronisation sequence carried in the OFDM symbol carrying a synchronisation signal as one of a plurality of possible synchronisation sequences.

\* \* \* \* \*